United States Patent

[11] 3,563,191

[72] Inventor Robert L. Yovanovich
 166 Kelly St., Metuchen, N.J. 08840
[21] Appl. No. 768,614
[22] Filed Oct. 11, 1968
[45] Patented Feb. 16, 1971
 Continuation-in-part of application Ser. No. 648,520, May 23, 1967, now abandoned, which is a continuation-in-part of application Ser. No. 398,968, Sept. 24, 1964, now abandoned.

[54] EARTH PREPARING APPARATUS
 5 Claims, 5 Drawing Figs.
[52] U.S. Cl. ................................................ 111/10,
 94/44, 171/98, 172/32, 172/112
[51] Int. Cl. ........................................... A01b 33/02
[50] Field of Search ..................................... 111/1, 10;
 172/112, 32, 117, 39; 171/85, 98; 94/44

[56] References Cited
UNITED STATES PATENTS
| | | | |
|---|---|---|---|
| 339,763 | 4/1886 | Gravelle | 111/1 |
| 1,276,843 | 8/1918 | Wentworth | 172/32X |
| 1,300,018 | 4/1919 | Reiter | 171/85 |
| 2,473,770 | 6/1949 | Seaman | 172/32X |
| 2,686,996 | 8/1954 | Reiter | 171/85 |
| 3,247,812 | 4/1966 | Luciano et al. | 172/117X |

Primary Examiner—Robert E. Pulfrey
Assistant Examiner—C. Coughenour
Attorney—Robert A. Green ABSTRACT: The disclosure is of earth preparing apparatus for separating rocks from soil and includes: a tiller for digging up the earth; a screen positioned behind the tiller and oriented to receive quantities of earth dug up by the tiller and to pass fine soil and reject rocks and other coarse nonsoil constituents; and a hood curved to form a large earth-receiving chamber behind the screen. The hood includes an adjustable blade at its lower edge for adjusting the level of the layer of rock-free soil. The operating stability of the apparatus with respect to maintaining a level course is controlled by the provision of a roller behind the hood whereby the apparatus can be maintained level, even though the earth over which it moves includes ruts, furrows, or other depressions. The apparatus of the invention also includes a seeder ahead of the roller for depositing seed on the rock-free layer of top soil, and it may include an auxiliary rake for removing large rocks.

INVENTOR.
ROBERT L. YOVANOVICH
BY Robert A. Green
ATTORNEY

INVENTOR.
ROBERT L. YOVANOVICH

EARTH PREPARING APPARATUS

This application is a continuation-in-part of application Ser. No. 648,520, filed May 23, 1967, now abandoned which was a continuation-in-part of application Ser. No. 398,968, filed Sept. 24, 1964, now abandoned.

BACKGROUND OF THE INVENTION

At the present time, equipment is available for preparing a layer of soil for seeding. However, there is no known equipment which prepares a layer or stratum of soil which is free of stones or other large aggregate or debris. In addition, there is no known single piece of equipment which can quickly and easily prepare a deep stone-free layer of soil and simultaneously smooth the layer of soil and sow seed therein.

SUMMARY OF THE INVENTION

Briefly, earth preparing apparatus embodying the invention includes a means for tilling a soil area to a selected depth. The tilling means operates by digging up the soil and throwing it rearwardly. Rearwardly of the tilling means is mounted a screen, against which the earth is thrown as it is dug up by the tiller. The screen is of a suitable mesh so that the earth is broken up and thrown therethrough while rocks, other solid particles, and debris are prevented from passing through and, in fact, this unwanted material strikes the screen and drops into the bottom of the trough or trench created by the tilling means as it picks up dirt. The earth which passes through the screen strikes a hood member and then falls into the trench on top of the rocks and the like which have fallen into the trench. The hood carriers soil grading means which smooths and grades the soil as it falls into the trench over the rocks and debris. A seeding device is mounted on the apparatus rearwardly of the screen and hood so that, as the soil bed is leveled, the desired seed is deposited thereon. The apparatus of the invention also includes a roll which assists in maintaining the operating level of the apparatus and assists in placing the deposited seed in place in the soil of the seed bed.

DESCRIPTION OF THE PREFERRED EMBODIMENTS

Figure 1:
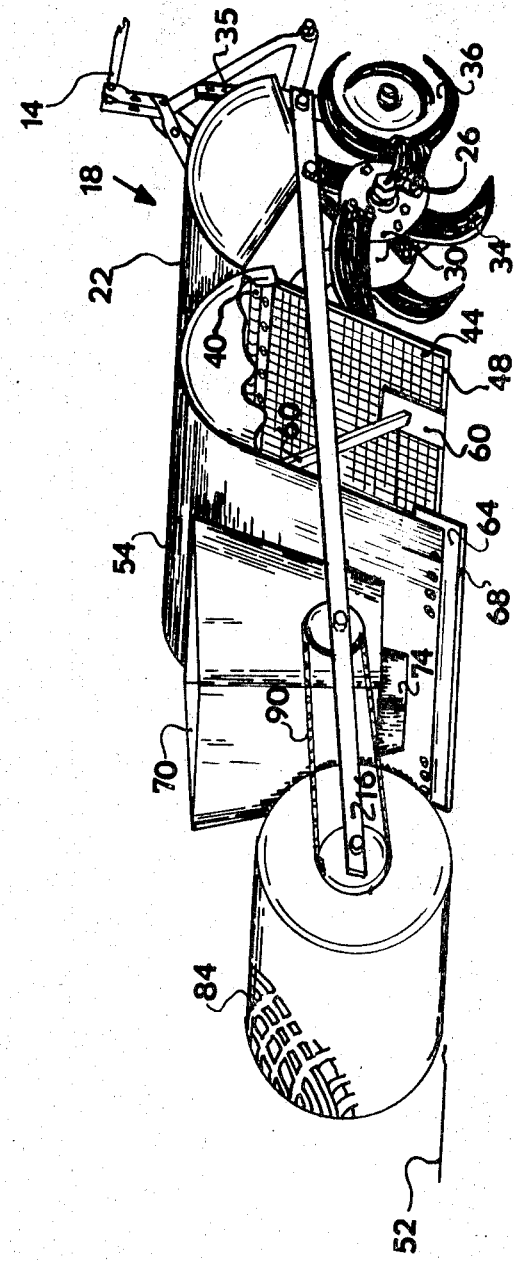
FIG. 1 is a perspective view of the invention.
Figure 2:
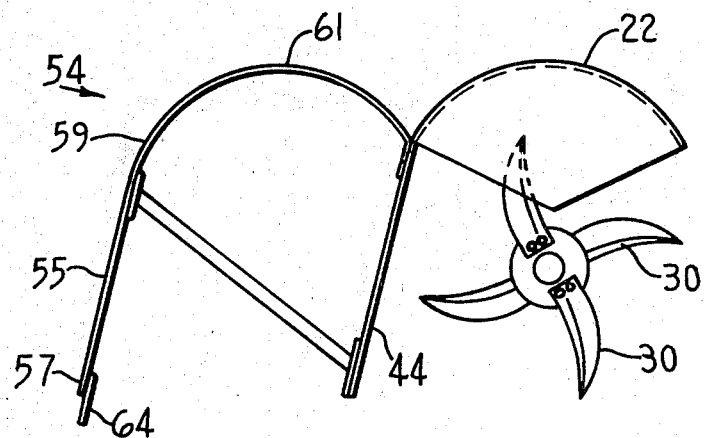
FIG. 2 is a side view of a portion of FIG. 1.

The following description of the invention spells out the essential features of the invention. Apparatus which it would be obvious to provide and which would be provided by those skilled in the art may or may not be described. Apparatus of this latter type includes housing members, support brackets, nuts, bolts, wheels on which the apparatus would move, etc.

Apparatus 10 embodying the invention is used in conjunction with a power source such as a tractor, bulldozer, or the like which is illustrated schematically at 14. Preferably, the apparatus includes a pair of generally horizontal side rails 16 which are secured to the tractor at one end and to which the various components of the invention are secured. The apparatus 10 includes, as one component, a rotary tiller 18 which is used to dig up quantities of earth and to hurl this earth rearwardly and upwardly as it is dug up. The tiller is coupled to and is driven by the tractor in known fashion. The rotary tiller includes a suitable curved housing or hood 22 which has a leading horizontal edge 100 and a rear horizontal edge 110, which are at about the same height above the tiller. The hood 22 is positioned above, and encloses, horizontal tiller shaft 26 which carriers a plurality of tine wheels 30 which carry tines 34 for performing the above mentioned tilling operations. The tiller housing 22 includes suitable brackets or the like (not shown) for supporting the tiller shaft 26 so that its vertical height can be adjusted. In addition, suitable brackets 35 are provided for supporting wheels 36 which permit the tilling apparatus 18 to be drawn along the ground by the tractor 14.

The shaft 26 is oriented horizontally, and it and its housing or hood 22 may be of any desired side-to-side length. In addition, substantially any number of tine wheels 30 may be mounted on the shaft and along its length. Behind the shaft 26 and the tine wheels, the rear edge 110 of the curved housing 22 is provided with a hinge 40 to which is secured a screen 44. The screen 44 extends along the length of the housing, and, in operation, it is intended to lie in a place which is oriented at a small angle to the vertical axis through the hinge area. The lower edge 48 of the screen extends slightly below the level of the earth represented by line 52.

Rearwardly of the screen 44, the housing includes a curved extension which forms a hood 54 which lies above and behind the screen. It is important that the hood 54 be spaced from the screen 44 sufficiently to provide a large chamber behind the screen. If this large chamber is not provided, all of the dirt picked up by the tiller cannot pass through the screen and will build up in the space between the tiller and the screen. To form the desired chamber, hood 54 includes a rear wall 55 spaced from screen 44 and oriented generally parallel thereto. The rear wall has its lower edge 57 oriented adjacent to the ground and its upper end 59 coupled by a curved connecting wall 61 to the rear edge of housing 22. Wall 61 has a front edge 120 which meets, and is coextensive with, rear edge 110 of hood 22.

Figure 3:
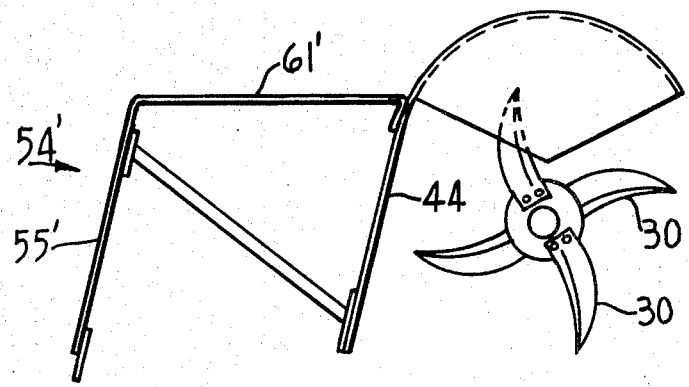
FIG. 3 is a side view of a modification of the apparatus shown in FIG. 2 and FIGS. 4 and 5.

In FIG. 3, hood 54' is generally L-shaped and includes rear wall 55' and a flat connecting wall 61'. Screen 44 and hood 54 both extend along the length of the apparatus parallel to shaft 26 which carries tines 30. The hood 54 is suitably secured to side rails 16. On the inner surface of the hood 54 and spaced apart along its length are secured several metal rods or plates 60 which operate as stops or spacers for the screen. These rods extend toward the screen and contact the screen to limit the angular clockwise rotation (as seen in the drawing) of the screen about its hinge 40 toward hood 54.

A grader bar 64 which comprises a generally flat plate or blade is secured to the lower end of the hood adjacent to the lower end of the screen, with its lower edge 68 horizontal and in position to grade the earth. The grader bar 64 is adjustably secured to the hood so that its height above the ground can be adjusted. A bolt and slot arrangement represented schematically at 65 or the like can be used.

Rearwardly of the hood 54 is mounted a seed container 70 which may take any suitable form and comprises, essentially, an elongated box for containing a supply of seed and having an adjustable discharge opening 74 which extends along its length and which is adjustable in size. A rotatable agitator (not shown) of well known construction is positioned inside the box 70 and is used to eject seed from the box. The seed box 70 is suitably coupled to the side rails 16.

In order to assist in maintaining the operating level of the apparatus 10 and its depth of penetration into the seed bed, and to set the seed in place in the soil bed, the apparatus 10 includes a roller 84 positioned behind the seed box 70 and suitably secured to side rails 16. The roller 84 is also approximately as long as the other components of the apparatus 10. In order to provide optimum operation with the soft earth of the seed bed, the roller 84 preferably has a surface which is made of expanded metal having relatively open mesh. A portion of this surface is shown in detail. The roller 84 is coupled to the agitator in seed box 70 by means of a pulley or cable 90 so that rotation of the roller 84 operates the agitator and feeds seed through opening 74. The roller 84 serves to maintain the apparatus 18 level at all times so that a smooth soil surface can be formed by blade 64.

In operation of the apparatus 10, power is applied by way of tractor 14, and the apparatus is driven along the earth. The tractor also causes shaft 26 of the tiller to rotate and cause the tine wheels 30 to dig into the earth. As the tine wheels perform this function, quantities of earth are picked up and thrown against the screen 44. The screen allows particles of soil to pass through while preventing rocks and other solid, relatively large particles from passing through. These large particles drop into the furrow or channel which has been created by the tine wheels. This channel may have a depth of, say, 4 to 6 inches. At the same time as the apparatus 10 moves along the ground, the earth particles which pass through the screen 44 strike the surface of the hood 54 and fall into the furrow, covering the stones and rocks and the like in the bottom of the furrow. In addition, as the apparatus moves, the grader bar 64 smooths the soil which has fallen into the furrow. As the soil is thus graded by bar 64, seed is deposited thereon from the seed box 70 through discharge opening 74. The roller 84, because of its surface configuration, does not penetrate deeply into the soil bed and thus helps to maintain the desired operating level of the apparatus. The open mesh construction of the surface of the roller also serves to provide small depressions in the seed bed in which seed will rest and which will serve to trap water. These small depressions also serve to prevent wind erosion.

From the foregoing description of the invention, it can be seen that the apparatus 10 is relatively simple in construction and operation and provides a seed bed which may be controlled in depth and which is substantially completely free of rocks and other relatively large, solid particles.

Figure 4:
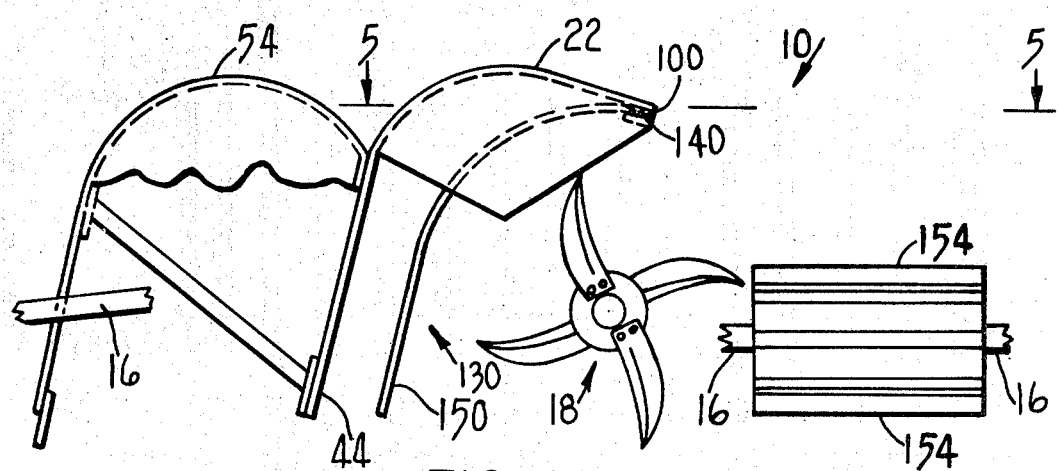
FIGS. 4 and 5 are side and plan views, respectively, of a modification of the invention.
Figure 5:
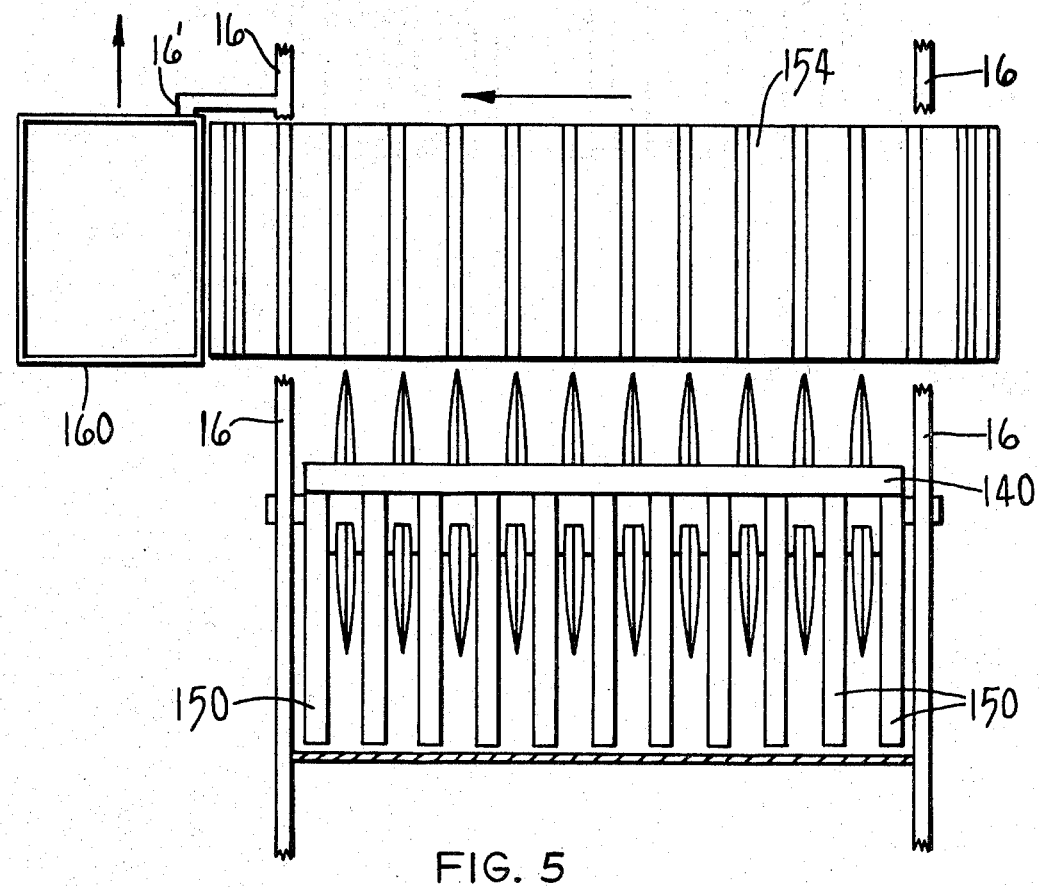

A modification of the invention 10' shown in FIGS. 4 and 5 uses all of the apparatus described above although only portions of this apparatus are shown. Apparatus 10' includes a metal rake 130 mounted between the tiller 18 and screen 44. The rake, in one construction, includes a metal plate 140, to which are secured a plurality of curved tines 150. For purposes of the present invention, the tines are spaced apart by about 3 inches. In mounting the rake 130, the plate 140 of the rake is welded or otherwise secured to the hood so that the rake is, in effect, supported by the same frame members which support the hood 22. The leading edge 100 of hood 22, and thus the position of plate 140 of the rake, is arranged so that rocks can be brought up between the rake and tiller and deposited on a receiver to be described.

In apparatus 10', sufficient space is provided between the tiller 18 and the rake 130 so that relatively large rocks, say, 4 to 5 inches in diameter, may be picked up between the tiller and the rake, lifted up toward the hood 22, and deposited on a conveyor 154 suitably supported, e.g. on rails 16, ahead of the tiller and movable from side to side to transport rocks to a bucket 160 mounted at the side of the machine to receive rocks from the conveyor. The bucket 160 might be mounted to move forward to the tractor area when it is filled. A stationary bucket might also be used in place of the conveyor 154. The conveyor 154 and bucket 160 can be supported in any suitable manner, e.g., by apparatus represented by arm 16' on side rails 16 or on any of the frame members 14 associated with the driving tractor. The tines 150 of the rake 130 are also positioned a suitable distance from the screen 44 to permit smaller rocks and dirt, as described above, to pass between the tines 150 onto and through the screen.

The apparatus 10' has the advantage that it includes means, the rake 130, for removing relatively large rocks which previously interfered with the tiller and often broke tiller tines, and other means, the screen 44, for removing smaller rocks.

Other advantages of the invention can best be appreciated when one compares the building of a lawn by prior art methods with building the same lawn with the apparatus of the invention. In the past, no single piece of equipment was available, and the building of a lawn, particularly a large-area lawn such as a golf course or athletic field, comprised digging up the soil with a disc mechanism, power-raking to remove rocks and stones, and then hand-raking to remove rocks left by the power-raking apparatus. Next, the treated area was seeded and rolled. With the apparatus of the invention, all of these operations can be performed in a single pass and by one man. In addition to the saving in time and manpower, the invention also produces a superior seed bed since the layer of top soil has been completely screened and, for all practical purposes, all stones have been removed. It has been found that the invention prepares a seed bed and deposits seed perhaps two to three times faster than the same operations could be performed in the past. It can be seen that the larger the lawn area to be prepared, the more dramatic is the saving in time and expense when the present invention is employed.

I claim:
1. Earth treating apparatus including:
   a rigid frame having a pair of side rails extending generally horizontally,
   said frame and said side rails having a front end adapted to be coupled to a power source,
   a generally M-shaped hood secured to said side rails near said front end and having first and second generally semicylindrical portions coupled together along their adjacent edges with their long axes parallel, said first portion having a free edge ahead of said adjacent edges and said second hood having a free edge behind and remote from said adjacent edges,
   a tiller for digging up the earth to a considerable depth disposed beneath said first semicylindrical portion and secured to said frame,
   a generally rectangular screen secured to approximately the juncture of said adjacent edges of said first and second portions of said hood and extending along the length of said hood, said screen extending downwardly toward what would be the ground when said apparatus is in position to perform work, said screen being slanted so that it extends away from said tiller and it faces said tiller at such an angle that it receives quantities of earth dug up thereby,
   a solid rear wall secured to said free edge of said second hood portion remote from said screen and extending therefrom toward the ground at such an angle that it is generally parallel to said screen, said second hood portion and said rear wall providing a large, earth-receiving chamber behind said screen which permits substantially all fine material dug up by said tiller to pass through said screen into said chamber and onto the ground beneath it, said rear wall having a lower end,
   a vertically adjustable blade secured to said rear wall at its lower end, said earth-receiving chamber formed by said second hood portion being adapted to carry along excess fine material,
   said blade serving to grade fine material as said apparatus moves along the ground, and
   a roller secured to said frame side rails behind said second hood portion, said roller determining the height of the grade formed by said blade and compacting the fine soil material.
2. The apparatus defined in claim 1 wherein said screen can be pivoted about its upper edge and including spacer means positioned between said second hood and said screen for holding said screen spaced from said second hood.
3. The apparatus defined in claim 1 and including a seed dispenser positioned rearwardly of said second hood and in front of said roller.
4. The apparatus defined in claim 1 wherein said roller has a surface of expanded metal.
5. The apparatus defined in claim 1 and including a fixed rake having a plurality of tines positioned between said tiller and said screen so that relatively large rocks can be picked up by said tiller and passed upwardly between said tines and said rake.